US011646139B2

(12) United States Patent
Xu et al.

(10) Patent No.: US 11,646,139 B2
(45) Date of Patent: May 9, 2023

(54) STELLARATOR MAGNET BASED ON CUBIC PERMANENT MAGNET BLOCKS AND ARRANGEMENT OPTIMIZATION METHOD THEREOF

(71) Applicant: Hefei Institutes of Physical Sciences, Chinese Academy of Sciences, Anhui (CN)

(72) Inventors: Guosheng Xu, Hefei (CN); Dehong Chen, Hefei (CN); Zhiyuan Lu, Hefei (CN); Xiangyu Zhang, Hefei (CN); Liang Chen, Hefei (CN); Minyou Ye, Hefei (CN); Ning Yan, Hefei (CN); Xingquan Wu, Hefei (CN)

(73) Assignee: Hefei Institutes of Physical Sciences, Chinese Academy of Sciences, Hefei (CN)

( * ) Notice: Subject to any disclaimer, the term of this patent is extended or adjusted under 35 U.S.C. 154(b) by 0 days.

(21) Appl. No.: 17/560,067

(22) Filed: Dec. 22, 2021

(65) Prior Publication Data
US 2022/0208397 A1 Jun. 30, 2022

(30) Foreign Application Priority Data
Dec. 31, 2020 (CN) .......................... 202011636945.4

(51) Int. Cl.
*H01F 7/00* (2006.01)
*H05H 1/12* (2006.01)
(Continued)

(52) U.S. Cl.
CPC ............... *H01F 7/00* (2013.01); *H01F 7/021* (2013.01); *H05H 1/12* (2013.01); *G21B 1/055* (2013.01)

(58) Field of Classification Search
CPC .......... H01F 7/00; H01F 7/021; H01F 7/0273; H01F 7/202; H05H 1/12; G21B 1/055; Y02E 30/10
See application file for complete search history.

(56) References Cited

U.S. PATENT DOCUMENTS 3,663,362 A * 5/1972 Stix .......................... H05H 1/12
376/127

FOREIGN PATENT DOCUMENTS

GB 875941 A * 8/1961

* cited by examiner

*Primary Examiner* — Mohamad A Musleh
(74) *Attorney, Agent, or Firm* — Seed IP Law Group LLP

(57) ABSTRACT

The present disclosure provides a stellarator magnet based on cubic permanent magnet blocks and an arrangement optimization method thereof. For the characteristic that a three-dimensional magnet coil of a stellarator is complex in structure, the present disclosure provides the stellarator magnet based on the cubic permanent magnet blocks with uniform magnetization, same magnetization and same size; the magnetization directions of the cubic permanent magnet blocks are defined in a limited number of fixed alternative directions; the magnetic field configuration of the stellarator is generated by dipole magnetic fields provided by the permanent magnet blocks and planar coils, so that the device complexity of the stellarator is reduced, and the difficulty and cost of the machining and installation of the magnet are reduced. The shape of the permanent magnet blocks can be replaced by other regular shapes, and the permanent magnet is still formed by the permanent magnet blocks with same shape, same size, uniform magnetization and same magnetization. For the magnet, the present disclosure provides a magnet arrangement optimization method of 'local compensation' and related optimization strategies of 'threshold truncation,' 'global fine tuning,' etc., for meeting different (Continued)

optimization requirements on accuracy of the magnetic fields, usage qualities of magnets, etc., and a magnetic field meeting designing requirements can be obtained.

8 Claims, 9 Drawing Sheets

(51) Int. Cl.
*H01F 7/02* (2006.01)
*G21B 1/05* (2006.01)

STELLARATOR MAGNET BASED ON CUBIC PERMANENT MAGNET BLOCKS AND ARRANGEMENT OPTIMIZATION METHOD THEREOF

BACKGROUND

Technical Field

The present disclosure belongs to the field of magnetic confinement fusion energy, relates to a magnetic confinement fusion device for the configuration of a stellarator, and specifically relates to a stellarator magnet based on cubic permanent magnet blocks and an arrangement optimization method thereof.

Description of the Related Art

A stellarator is a magnetic confinement fusion device, which confines plasma through the closed magnetic field configuration with toroidal spiral magnetic field. The toroidal spiral magnetic field is generated by external magnets, and the magnetic surface is toroidal asymmetric and twisted. For the traditional stellarator, external magnet coils generate both the toroidal and the poloidal magnetic field to form the magnetic field configuration of the stellarator. Therefore, the geometric shape of the magnet coils in traditional stellarator is very complex, which will bring great challenges to the machining and manufacturing of the stellarator, and the cost will be also increased greatly.

A permanent magnet is a magnet that can be magnetized by an external magnetic field to generate a dipole magnetic field and can maintain magnetism for a long time after the external magnetic field is removed. Although it is known from the physical principle that an toroidal closed vacuum magnetic field cannot be generated through any arrangement of the permanent magnet, if toroidal magnetic fields are generated by planar coils, a normal magnetic field component will be generated on the magnetic surface of the plasma equilibrium configuration of the stellarator, and the bipolar magnetic field of the permanent magnet can be used for offsetting the normal magnetic field component to form the closed and twisted magnetic field configuration of the stellarator together with the toroidal magnetic field generated by planar coils. P. Helander et al. calculated the required distribution of magnetization of the permanent magnet on the surface of the vacuum vessel by taking a quasi-axisymmetric stellarator as an example, and proved in principle that the poloidal magnetic field and rotation transform required by the stellarator can be generated by the permanent magnet, in another word, the magnetic field configuration of the stellarator can be obtained by combining permanent magnet with the planar coils (Paper 1: P. Helander, et. al. Stellarators with Permanent Magnets. Phys. Rev. Lett. 2020, 124 095001).

Based on this, recent studies have made some useful explorations on the design solution and related algorithms of a permanent magnet used to the stellarator. Among them, C. Zhu et al. adopted a 'multilayer method' to design permanent magnets of stellarators (Paper 2: C. Zhu, et. al. Designing stellarators using perpendicular permanent magnets. Nucl. Fusion, 2020 60 076016). Based on the traditional stellarator design program NESCOIL or REGCOIL, the surface current distribution of the curved winding surface of coils were calculated to be equivalent to the total magnetization distribution required on the curved winding surface, and then the magnetization distribution of each layer of permanent magnets is iteratively optimized, wherein the total thickness of the permanent magnets is fixed, and the magnetization direction of the permanent magnets everywhere is perpendicular to the curved winding surface and the magnetic surface of plasma; K. C. Hammond et al. proposed and designed a new arrangement solution of permanent magnet blocks based on the shape of 'curve bricks' and 'quadrilateral hexahedron' (Paper 3: K. C. Hammond, et. al. Concepts for stellarator permanent magnet arrays, Nucl. Fusion, 2020 60 106010). The magnetization of all the permanent magnet blocks is not required to be the same and limited to less than a maximum achievable value of magnetization of the permanent magnet blocks. Through calculation, it is found that the accuracy of obtained magnetic field cannot meet the requirement of design if the magnetization directions of all the permanent magnet blocks are perpendicular to the winding surface of the vacuum vessel, but the accuracy of obtained magnetic field can meet the requirement of design if the magnetization directions are freely selected. C. Zhu et al. gave a new design optimization algorithm for the design solution in Paper 3 (two permanent magnet blocks shapes: 'curved brick' and 'quadrangular hexahedron') (Paper 4: C. Zhu, et. al. Topology optimization of permanent magnets for stellarators. Nucl. Fusion 2020 60 106002). Each permanent magnet blocks is regarded as a magnetic dipole, and the magnetization and magnetization direction of each permanent magnet blocks are transformed into a continuous function; then, the problem of calculating the magnetization and the magnetization direction of each permanent magnet block becomes a nonlinear optimization problem for the continuous function, which are solved by a quasi-Newton method. Matt Landreman et al. put forward a method called a 'linear least square method.' According to the approximate linear relationship between the magnetization and the volume of the permanent magnets, the volumes and directions of the magnet blocks are iteratively calculated by using the least square method, wherein the magnetization direction of the permanent magnets can be freely selected. This method can be used for the design for the permanent magnets of the stellarators (Paper 5: Matt Landreman, et. al. Calculation of permanent magnet arrangements for stellarators: A linear least-squares method. arXiv: 2009.06535 (physics)).

BRIEF SUMMARY

For the characteristic that magnet coils of a stellarator are complex in structure, the present disclosure provides a solution of a stellarator magnet based on cubic permanent magnet blocks with uniform magnetization, same magnetization and same size; and the magnetic field configuration of the stellarator is generated by dipole magnetic fields provided by the permanent magnet blocks and planar coils, so that the device complexity of the stellarator is reduced, and the difficulty and cost of the machining and installation of the magnet are reduced.

The stellarator magnet based on the cubic permanent magnet blocks comprises permanent magnet, permanent support structure, coil systems, vacuum vessel and other auxiliary equipment and is used for confining plasma. The stellarator magnet is characterized in that:

the permanent magnet comprises a large number of cubic permanent magnet blocks with same size;

all the cubic permanent magnet blocks in the permanent magnet are uniformly magnetized and have same magnetization;

the magnetization directions of each cubic permanent magnet block in the permanent magnet are defined in a limited number of fixed alternative directions; and the alternative directions comprise: a direction perpendicular to a surface of the cubic permanent magnet block, or a direction that one edge of each cube perpendicular to another parallel edge, or a direction that a vertex of the cube points to another vertex;

the permanent magnet is arranged outside the vacuum vessel and in a space surrounded by the coil systems; and the permanent magnet is fixed by the support structure and the cubic permanent magnet blocks are embedded into compartments formed by the permanent support structure.

The size and position of each cubic permanent magnet block are determined by dividing a space with a grid, in which the permanent magnet is located, into small cubic cells with same size, the size of each permanent magnet block is less than that of each cubic cell, and the gap between every two adjacent permanent magnet blocks is a space occupied by the permanent magnet support structure.

Part of the compartments formed by the support structure used for fixing the permanent magnet blocks could be empty or could be replaced by non-magnetic materials.

The cells used for determining the size and the positions of the cubic permanent magnet blocks are determined by the following two manners:

(1) the space, in which the permanent magnet is located, is divided into the cubic cells with same size along an x-direction, a y-direction and a z-direction in a Cartesian coordinate system, and the adjacent three edges of each cubic cell are respectively parallel to an x-axis, a y-axis and a z-axis;

(2) the positions and size of the permanent magnet blocks are determined by dividing a right prism which is coaxial with the toroidal vacuum vessel into cells, wherein the right prism is divided into a plurality of triangular prisms by the cutting planes connected with the center axis and the side edges; each triangular prism is divided into cubic cells with same size; and the two adjacent surfaces of the cubic cells are parallel to the side surfaces and the bottom surface of the triangular prism. When the cubic permanent magnet blocks are placed in a plurality of triangular prisms, some small non-cubic cell are formed simultaneously due to intersection of the cutting planes and the grid; these non-cubic small cells could be empty or installed by permanent magnetic blocks in shapes matching with the non-cubic cells; the magnetization directions of the non-cubic permanent magnet blocks are still defined in a limited number of fixed alternative directions; and the alternative directions comprise a direction perpendicular to a surface or an edge of each non-cubic permanent magnet block. Through adoption of the solution, the permanent magnet blocks can be prevented from being demagnetized due to that the magnetization directions of the permanent magnet blocks are opposite to the direction of the toroidal magnetic field.

Meanwhile, the shape of the permanent magnet blocks can be replaced by other regular shapes which comprise an inequilateral cuboid, a parallelogram prism, a triangular prism, a trapezoid prism and the like. When permanent magnet blocks in other certain regular shapes are adopted, the permanent magnet is still formed by the permanent magnet blocks with same shape, same size, uniform magnetization and same magnetization, and the magnetization directions are defined in a limited number of alternative directions; the size and position of permanent magnet blocks are also determined by dividing the space occupied by permanent magnet into array-arranged small cells with one adopted shape; and the small cell with different shape, which simultaneously formed, could be filled by shape-matching permanent magnet blocks or not.

The solution of the present disclosure is completely different from the existing disclosed solution of a permanent magnet stellarator. All the permanent magnet blocks adopted in the present disclosure have same shape, same size, uniform magnetization and same magnetization. And the permanent magnet arrangement solution that are proposed by the present disclosure adopt the cubic permanent magnet blocks, so that their arrangement manner surrounding the outside of the plasma is similar to a staking manner of Lego blocks, and the magnetization directions of each cubic permanent magnet block are defined in a limited number of directions related to the shape of the permanent magnet blocks. Those solution of the permanent magnet are completely different from the solution from in Papers 2, 3 and 4, in which the shape of permanent blocks are a 'quadrilateral hexahedron' or a 'curved brick,' and their magnetization directions are fixed in a direction perpendicular to the surface of the plasma or be full freely chosen.

A magnetic field meeting requirements cannot be generated by simply stacking the permanent magnet blocks; the number of the permanent magnet blocks required by one stellarator in the present disclosure is more than $10^4$ orders of magnitude; The quantity of arrangements of the all the permanent magnet blocks with magnetization directions will be a huge number, so that a design meeting the requirements cannot be found by an exhaustive method according to the existing computer ability, therefore, an appropriate optimization method is required. The present disclosure provides a set of magnet arrangement optimization methods called 'local compensation' and develops optimization strategies including 'threshold truncation,' 'global fine tuning' and so on for meeting different optimization requirements on accuracy of the magnetic fields, usage qualities of magnets, etc. Corresponding optimization algorithms are developed to obtained a magnetic field meeting designing requirements, with characteristics of high calculation speed and less less consumption of resources consumption by comparing with the traditional optimization algorithm. The specific steps are described as follows:

(1) calculating the total normal magnetic field $B_n$ on the surface of the plasma, which is generated by the external coils and plasma current and needs to be compensated by the magnetic field generated by the permanent magnets.

(2) when optimizing the permanent magnet arrangement, firstly, sequencing all the permanent magnet blocks according to their distance to the surface of the plasma from the nearest to the farthest, and then calculating the normal magnetic field distribution on the surface of the plasma generated by each permanent magnet block, each permanent magnet block has n alternative magnetization directions $\{N^i\}$, i=1, 2, . . . , n; and recording the n normal magnetic field distributions $\{B_{block}{}^i\}$ on the surface of the plasma generated by each permanent magnet block with the n alternative magnetization directions $\{N^i\}$, i=1, 2, . . . , n and the position $\{p^i\}$ of the maximum value of the absolute value thereof, the normal magnetic field distribution $B_{block}{}^i$ and the position $p^i$ are in one-to-one correspondence; $\{B_{block}{}^i\}$ are generated by the permanent magnet block with n alternative magnetization directions $\{N^i\}$, i=1, 2, ..., n; $\{B_n(p^i)\}$ represent the value of the normal magnetic field of $B_n$ locating at the corresponding position $\{p^i\}$; and the magnetic field $\{B_n(p^i)\}$ need to be offset by $\{B_{block}^i\}$.

(3) scanning the permanent magnet blocks one by one according to the order, and for each permanent magnet block, analyzing whether the absolute value of the normal magnetic field $B_n$ at the locations where the normal magnet field generated by the scanned permanent magnet block with the corresponding magnetization directions present the maximum, $\{|B_n(p^i)|\}$, can be compensated to smaller values; and picking out the m (m≤n) magnetization directions that their corresponding $\{|B_n(p^i)|\}$ can be compensated; if the scanned permanent magnet block cannot generate the compensation effect with any of the alternative magnetization directions, m=0, the scanned permanent magnet block will be set as a vacancy;

(4) if m>0, selecting the magnetization direction N corresponding to the maximal $|B_n(p^i)|$ in $\{|B_n(p^i)|\}$ as the magnetization direction of the permanent magnet block, and then superposing the normal magnetic field distribution $B_{block}$ generated by the permanent magnet block onto $B_n$ to form a new normal magnetic field $B_n$ which needs to be compensated, wherein J=1, 2, ..., m; the steps (3) and (4) essentially refer to that: when determining the magnetization direction of each permanent magnet block, among the magnetization directions that are capable of generating the compensation effect on the corresponding $\{|B_n(p^i)|\}$, the one corresponding to the maximal $\{|B_n(p^i)|\}$ is selected, and if all the magnetization directions do not generate the compensation effect, the permanent magnet block will be set as a vacancy;

(5) after the magnetization directions of all the permanent magnet blocks are determined according to the steps (3) and (4), calculating the surface integral of the normal magnetic field square $\chi_B^2 = \int_{BP}(B_n)^2 ds$ on the surface of the plasma and then continuing to perform the next iteration according to the steps (3) and (4) until $\lambda_B^2$ is converged to the predetermined level, which is the optimization strategy of the 'local compensation';

(6) in the above iterative process, setting the normal magnetic field threshold $B_n^{thr}$ on the surface of the plasma for the 'local compensation' is required; when the absolute value $|B_n(p^i)|$ of the normal magnetic field which needs to be compensated on the surface of the plasma is smaller than the given threshold $B_n^{thr}$, abandoning the magnetization direction $N^i$ of the scanned permanent magnet block for the current iteration, which is the optimization strategy of 'threshold truncation'; it requires to adjust the threshold value to find the optimal result;

(7) when the above steps are completed, analyzing the permanent magnet blocks one by one according to the order sorted by the distance to the surface of the plasma with a new optimization criterion; for each permanent magnet block, calculating the surface integral of the normal magnetic field square on the surface of the plasma $\{(\chi_B^2)_2\}$ (k=1, 2, ..., n, n+1) after the corresponding compensation of $B_n$ using each magnetization direction, where k indicates the magnetization direction and the $(n+1)^{th}$ magnetization direction represents the permanent magnet block is a vacancy; and selecting the magnetization direction corresponding to the minimal $\chi_B^2$ as the magnetization direction of the permanent magnet block, and meanwhile update $B_n$ and $\chi_B^2$ that need to be compensated for the following work; finally replacing the steps (3) to (6) with the step (7) and continuing to perform the iteration until $\chi_B^2$ is converged to the predetermined level, which is the optimization strategy of the 'global fine-tuning.'

When the optimization strategy of 'global fine tuning' is adopted, iterative optimization is performed on all the magnet blocks, or iterative optimization is performed on a part of permanent magnet blocks selected as required. The constraint of position for magnet spaces and the selection for the magnetization directions can be adjusted more meticulously according to actual engineering requirements.

Further, the magnet arrangement optimization method of 'local compensation' and the optimization strategies of 'threshold truncation' and 'global fine tuning' are also suitable for the permanent magnet arrangement optimization design for the magnetic field configuration of a closed magnetic surface in other fields; and in addition, each permanent magnet block can be in any size and shape, the magnetization of all the permanent magnet blocks can be different, and the magnetization directions of each permanent magnet block can be random finite alternative directions.

The beneficial effects of the present disclosure are described as follows:

Compared with the existing disclosed solution of the permanent magnet stellarator and the related permanent magnet arrangement optimization method, the solution of the stellarator magnet and the arrangement optimization method thereof, which are provided by the present disclosure have the advantages that: in the solution of the permanent magnet provided by the present disclosure, adopting the identical permanent magnet blocks with same size, same magnetization and same magnetization direction is favorable for machining and manufacturing of the permanent magnet blocks. When the permanent magnet blocks are installed and arranged, it is just need to adjust the included angle between the magnetization directions of the permanent magnet blocks and the reference coordinate axis in the finite direction options according to the design; as the permanent magnet blocks are array-arranged in cubic or regular hexahedral cells, the permanent magnet blocks can be assembled in a 'drawer type' firstly, in other words, the permanent magnet blocks of each row or each line can be placed in a drawer-shaped structure, and then the 'drawer type' assembled permanent magnet can be inserted into the main frame of magnet support structure This is very favorable for installation and maintenance of the permanent magnet blocks. Meanwhile, if the permanent magnet blocks are very small, a group of permanent magnet blocks can be glued into a bigger cubic magnet block set (similar to a 'Rubik's cube') for installation. Through adoption of the magnet arrangement optimization method called 'local compensation' and the optimization strategies of 'threshold truncation' and 'global fine tuning' which are provided by the present disclosure, it is capable to obtain an arrangement solution that the permanent magnet blocks have fixed magnetization and discrete magnetization directions can be obtained, and to achieve higher accuracy of magnetic field, for meeting the engineering requirements. When the other regular shaped non-cubic permanent magnet blocks are adopted, it also has the above advantages, and it can also be designed by using the above magnet arrangement optimization method. In comparison, in the other existing magnet arrangement optimization methods, the magnetization and the magnetization direction should be continuous functions for calculation, so that a certain gap exists between the obtained final results and the actual engineering. Therefore, the solution of the stellarator magnet and the arrangement optimization method thereof, which are provided by the present disclosure, are strong in novelty, innovativeness and practicability.

DETAILED DESCRIPTION

The technical solutions in embodiments of the present disclosure are described clearly and completely hereinafter in combination with the drawings in the embodiments of the present disclosure. Obviously, the described embodiments are only a part of embodiments of the present disclosure and are not all the embodiments. All other embodiments obtained by those ordinary skilled in the art based on the embodiments in the present disclosure on the premise of not contributing creative work belong to the protection scope of the present disclosure.

Figure 1:
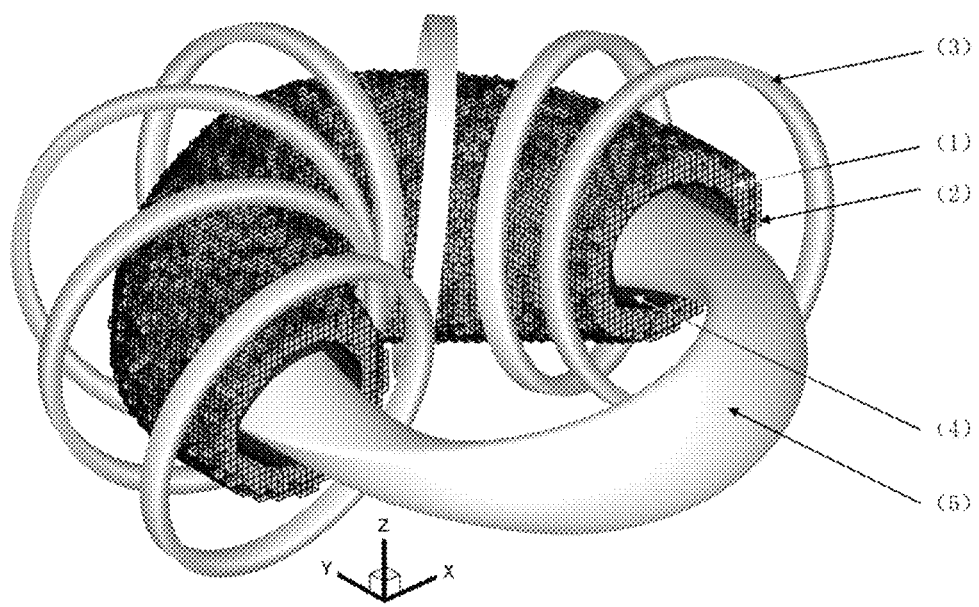
FIG. 1 is a stellarator magnet based on cubic permanent magnet blocks (only the toroidal ½ circle of a permanent magnet, a permanent support structure, coil systems and a vacuum vessel is shown)

According to the embodiments of the present disclosure, a stellarator magnet based on cubic permanent magnet blocks is provided. As shown in FIG. 1, the stellarator magnet comprises a permanent magnet 1, a permanent support structure 2, coil systems 3, a vacuum vessel 4 and other auxiliary equipment and is used for confining plasma 5.

The permanent magnet comprises a large number of cubic permanent magnet blocks with same size;

all the cubic permanent magnet block in the permanent magnet are uniformly magnetized and have same magnetization;

the magnetization directions of each cubic permanent magnet block in the permanent magnet are defined in a limited number of fixed alternative directions, such as: a direction perpendicular to a surface or an edge of the cubic permanent magnet block;

the permanent magnet is arranged outside the vacuum vessel and in a space surrounded by the coil systems;

the permanent magnet is fixed by the support structure and the cubic permanent magnet blocks are embedded into compartments formed by the support structure; and the size and position of each cubic permanent magnet block are determined by dividing a space with a grid, in which each permanent magnet is located, into small cubic cells with same size. The size of each permanent magnet block is less than that of each cubic cell, and the gap between every two adjacent permanent magnet blocks is a space occupied by each permanent magnet bracket. Part of the compartments formed by the support structure used for fixing the permanent magnet blocks could be empty or could be filled by non-magnetic material blocks.

Figure 2:
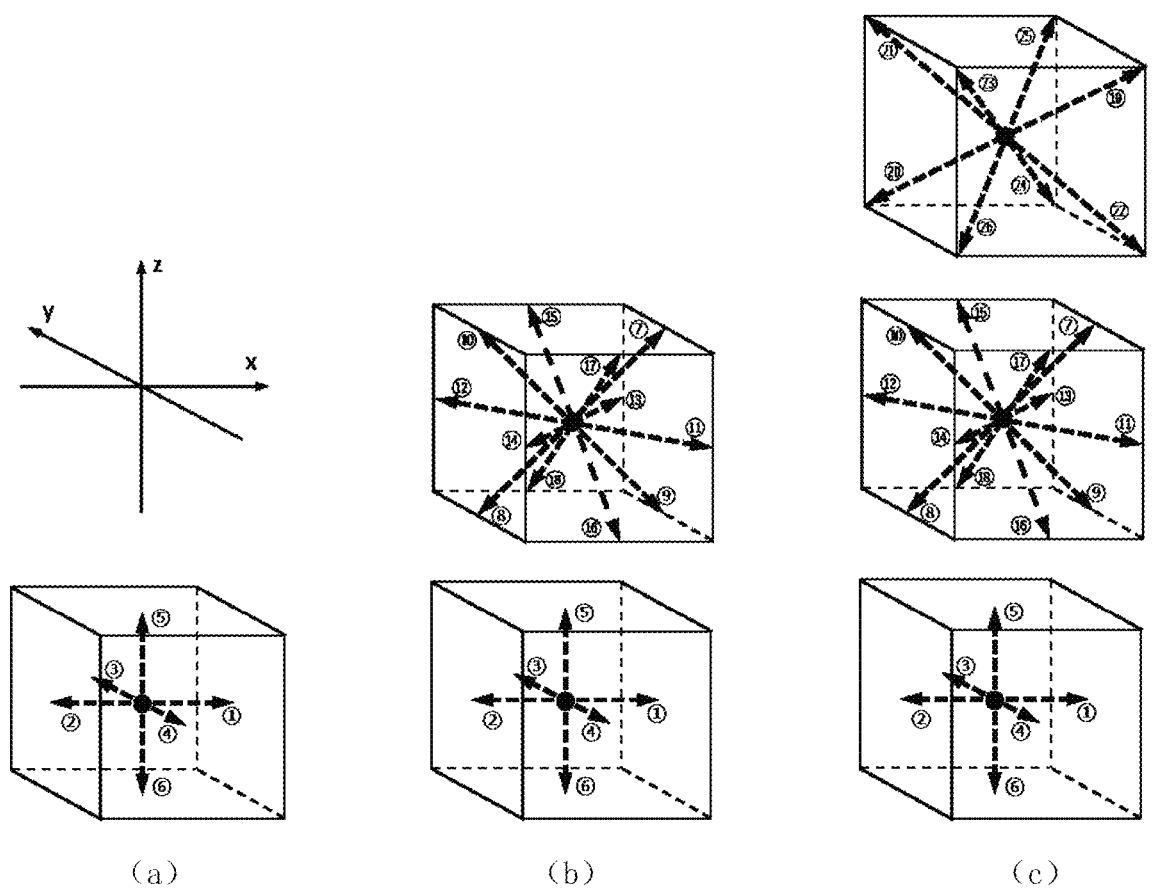
FIG. 2 is alternative magnetization directions of the cubic permanent magnet blocks: (a) is a diagram that the magnetization directions of the permanent magnet blocks are the directions perpendicular to the two opposite surfaces of the cube; (b) is a diagram that the magnetization directions of the permanent magnet blocks are the directions perpendicular to the two opposite edges of the cube, including the directions perpendicular to the two opposite surfaces; and (c) is a diagram that the magnetization directions of the permanent magnet blocks are the directions that a vertex of the cube points to another vertex, including the directions perpendicular to the two opposite surfaces and the two opposite edges.

According to the embodiments of the present disclosure, the following two types of arrangement solutions of the permanent magnet can be adopted:

In a first type of arrangement solution, a space, in which the permanent magnet is located, is divided into cubic cells in a Cartesian coordinate system. One cubic permanent magnet block is placed in each cell. The magnetization directions of each permanent magnet block are perpendicular to the two opposite surfaces of the cube, and the total number of directions is 6 as shown in FIG. 2 (a), actually, due to the symmetry of the cube, only one direction is selected when in machining, which is the direction ① as shown in the figure. The magnetization direction of each permanent magnet block can also perpendicular to the two opposite edges of the cube, including the direction perpendicular to the two opposite surfaces, and the total number of directions is 18 as shown in FIG. 2 (b), actually, due to the symmetry of the cube, only one of two directions needs to be selected when in machining, which is the direction ① or ⑦ as shown in the figure. The magnetization direction of each permanent magnet block can also be the direction that a vertex of the cube points to another vertex, including the directions perpendicular to the two opposite surfaces and perpendicular to the two opposite edges, and the total number of directions is 26 as shown in FIG. 2 (c), actually, due to the symmetry of the cube, only one of three directions needs to be selected when in machining, which is the direction ①, ⑦ or ⑲ as shown in the figure.

Figure 3:
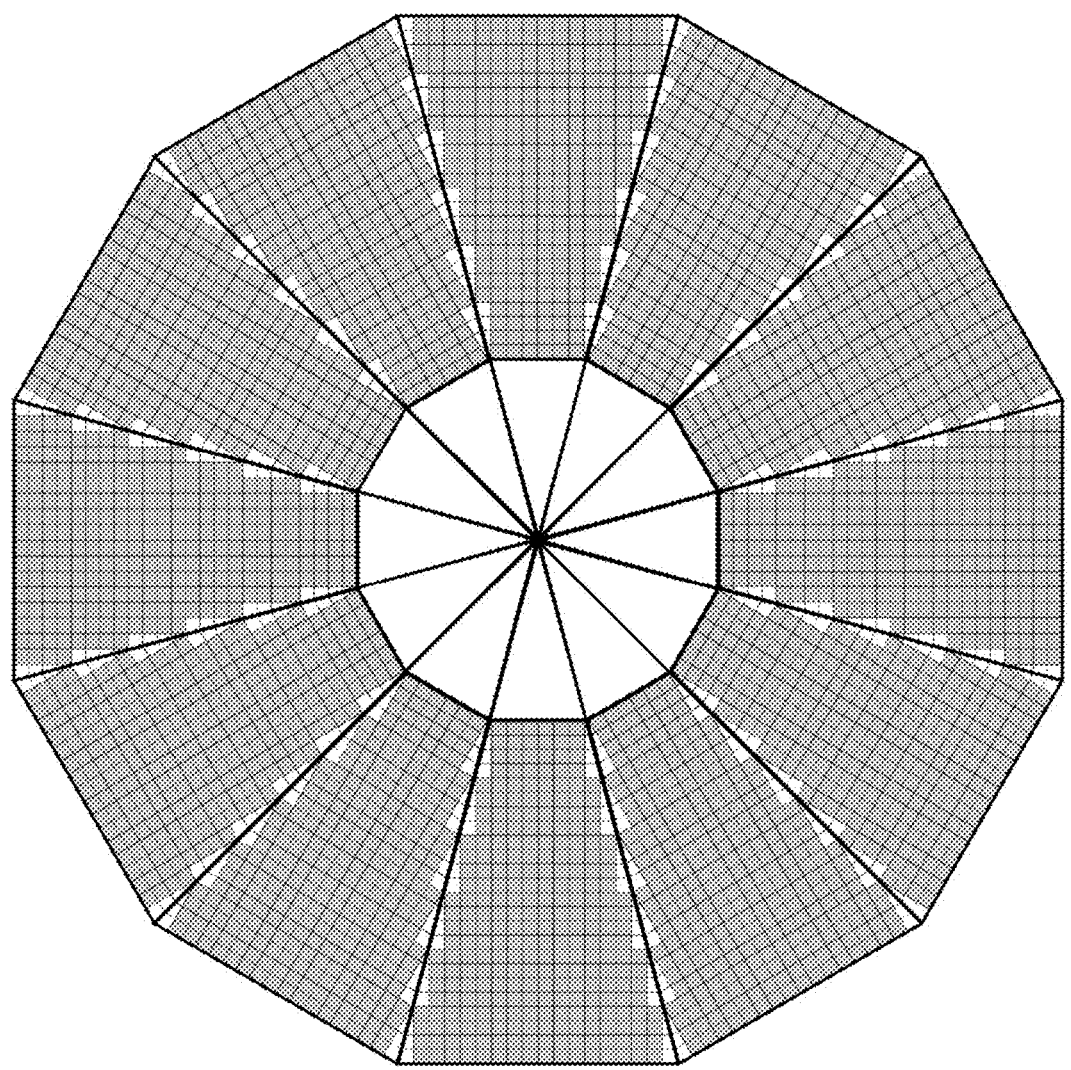
FIG. 3 is a horizontal cross-section after a twelve-prism is divided into small cubic cells: the twelve-prism is divided into twelve triangular prisms, and meanwhile, each triangular prism is independently divided into cubic cells, wherein the two adjacent surfaces of the cubic cells are respectively parallel to the side surfaces and the bottom surface of the triangular prism.

In a second type of arrangement solution, a polygon prism structure is constructed on the periphery of the vacuum vessel in the space, in which the permanent magnet is located. The bottom surface of the polygon prism can be a regular hexagon, a regular octagon, a regular dodecagon and the like; and the polygon prism is divided into a plurality of triangular prisms by the cutting planes, wherein the center axis of the polygon prism and each edge are located in each of the planes. Each triangular prism is divided into a large number of small cubic cells or other parallelepiped cells, which two adjacent surfaces are respectively parallel to the side surfaces and the bottom surface of the triangular prism, and in which the permanent magnet blocks are arranged in. FIG. 3 shows a case of that the bottom surface of a triangular prism is a regular dodecagon.

For the case of that the cubic cells are adopted, the magnetization directions of each permanent magnet block can still refer to three samples shown in the FIG. 2. However, for a large stellarator device with higher toroidal magnetic field, the sample in FIG. 2 (a) is more appropriate for preventing the permanent magnet block from being demagnetized by setting the magnetization directions of permanent magnet block perpendicular to the toroidal magnetic field of the stellarator when design the permanent magnet.

Figure 4:
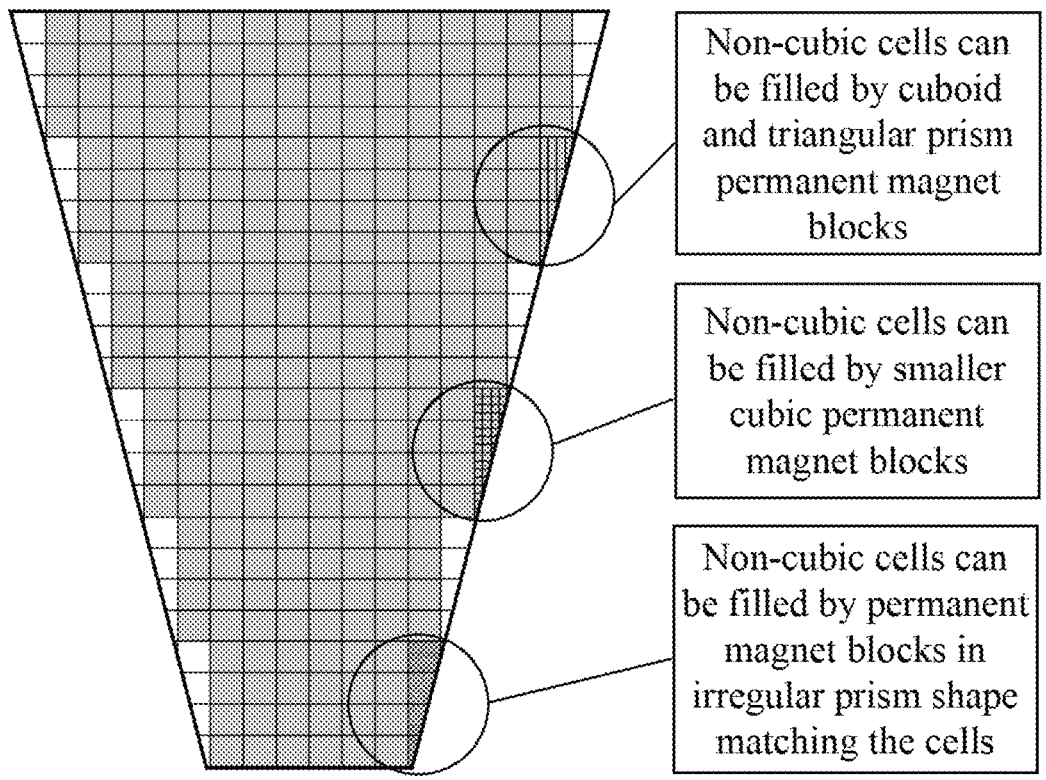
FIG. 4 is a diagram of a horizontal cross-section after the triangular prism is divided into the cubic cells, wherein non-cubic cells can be filled by permanent magnet blocks in shapes matching with those non-cubic cells or be empty.

A part of cells will not be cubic when the space are divided by the dividing planes and grid crossed with other surfaces such as curved surfaces surrounded by the coil systems, the outer surface of the vacuum vessel and the cutting planes of a cutting right prism. As these cells are not complete cubes, they could be empty or filled by permanent magnet blocks with the same shape as that of the non-cubic cells; or the non-cubic cells could be divided into smaller cells in other regular shapes for filled by permanent magnet blocks with the same regular shape, which is shown in FIG. 4.

Figure 5:
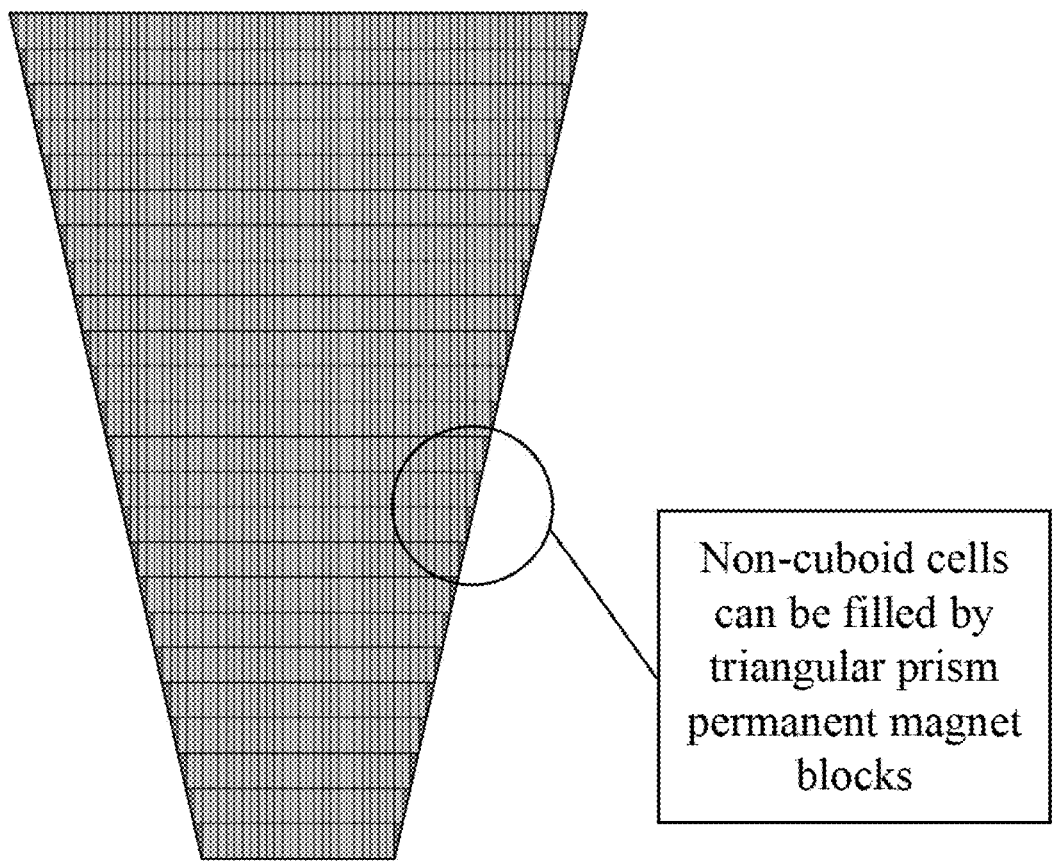
FIG. 5 is a diagram of a horizontal cross-section after the triangular prism is divided into cuboid cells: each cell is a cuboid with three edges that are not completely equal, wherein non-cuboid cells can be filled by triangular right prism permanent magnet blocks or be empty.
Figure 6:
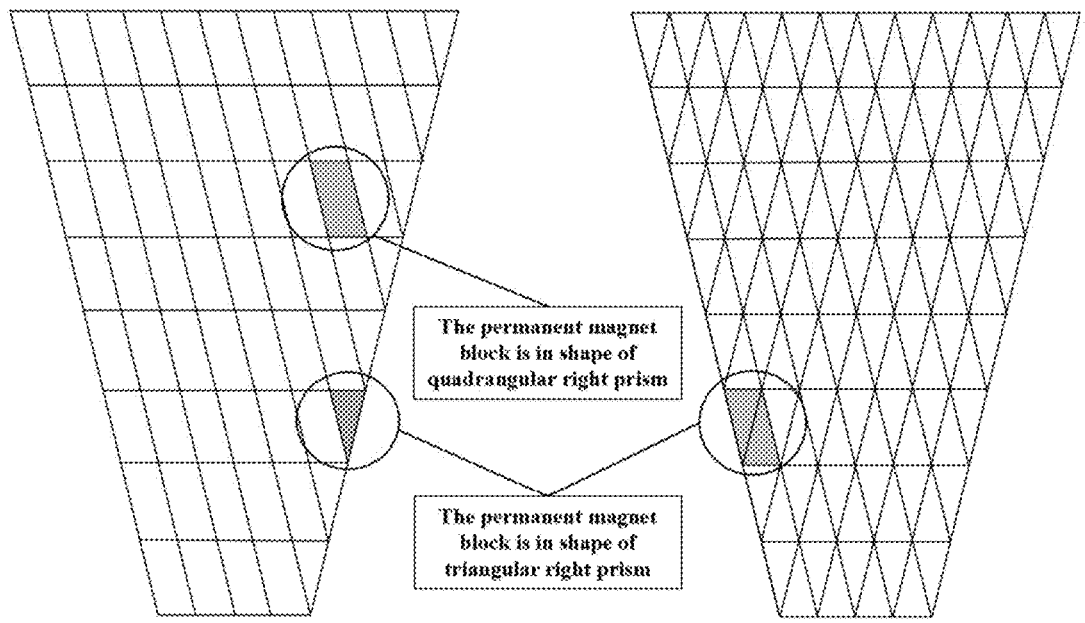
FIG. 6 is a diagram of a horizontal cross-section after the triangular prism is divided into cells: (a) is a diagram that a triangular prism space is divided into a plenty of parallelogram prism cells, and spare parts are filled by triangular prisms cells; and (b) is a diagram that the triangular prism structure is completely divided into triangular prisms.

The permanent magnet blocks can be in other regular shapes except for cube, such as an inequilateral cuboid, a parallelogram prism, a triangular prism, a trapezoid prism and the like, which can be generated by dividing the space with a grid in Cartesian coordinate system or the above described polygon prism into a large number of small cells with these regular shapes, which are shown in FIG. 5 and FIG. 6. When the permanent magnet blocks in a certain regular shape are adopted, the permanent magnet is still formed by the permanent magnet blocks with same shape, same size, uniform magnetization and same magnetization, and the magnetization directions of each permanent magnet block are defined in a limited number of fixed alternative directions. For the cells that cannot be filled by the permanent magnet blocks in the certain shape, they can be empty or filled by permanent magnet blocks in other shapes matching with those cells.

Figure 7:
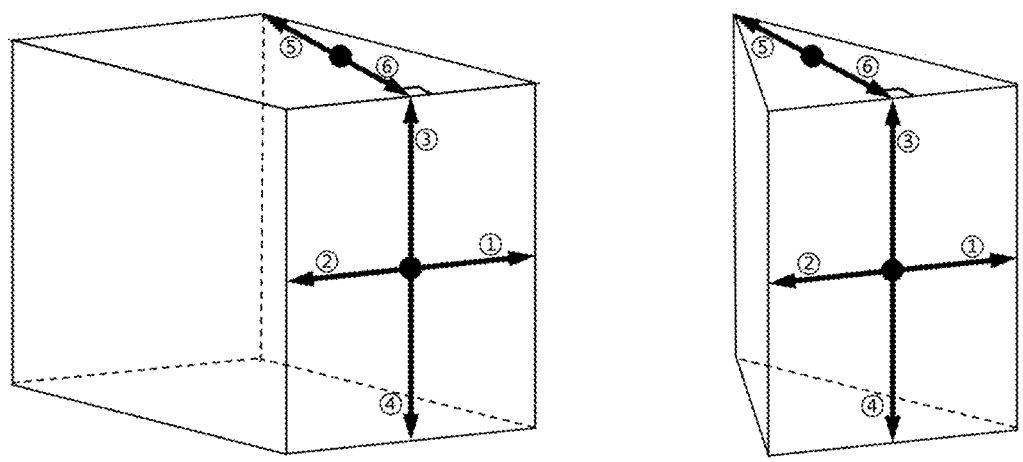
FIG. 7 is a diagram of alternative magnetization directions of a parallelogram prism permanent magnet block and a triangular prism permanent magnet block.

For each of the above permanent magnet blocks in other regular shapes except for cube, such as the inequilateral cuboid, the parallelogram prism, the triangular prism, the trapezoid prism and the like, the magnetization directions are defined in a limited number of fixed alternative directions, such as a direction perpendicular to a surface or an edge of the permanent magnet block, which is shown in FIG. 7.

The shape, size and placing position of the permanent magnet blocks are determined by adopting the above solution. When the permanent magnet blocks are installed and arranged, it is just need to adjust the included angle between the magnetization directions of the permanent magnet blocks and the reference coordinate axis in the finite direction options according to the design.

The arrangement of the magnetization directions of each permanent magnet block can be obtained through optimization of a 'local compensation' method provided by the present disclosure, and different requirements on accuracies and usage quantities of the magnets can be realized by adopting optimization strategies of 'threshold truncation,' 'global fine tuning' and the like. The specific steps are described as follows:

(1) calculating the total normal magnetic field $B_n$ on the surface of the plasma, which is generated by the external coils and plasma current and needs to be compensated by the magnetic field generated by the permanent magnets.

(2) when optimizing the permanent magnet arrangement, firstly, sequencing all the permanent magnet blocks according to their distance to the surface of the plasma from the nearest to the farthest, and then calculating the normal magnetic field distribution on the surface of the plasma generated by each permanent magnet block, each permanent magnet block has n alternative magnetization directions $\{N^i\}$, i=1, 2, ..., n; and recording the n normal magnetic field distribution $\{B_{block}^i\}$ on the surface of the plasma generated by each permanent magnet block with the n alternative magnetization directions $\{N^i\}$, i=1, 2, ..., n and the position $\{p^i\}$ of the maximum value of the absolute value thereof, the normal magnetic field distribution $B_{block}^i$ and the position $p^i$ are in one-to-one correspondence; $\{B_{block}^i\}$ are generated by the permanent magnet block with n alternative magnetization directions $\{N^i\}$, i=1, 2, ..., n; $\{B_n(p^i)\}$ represent the value of the normal magnetic field of $B_n$ locating at the corresponding position $\{p^i\}$; and the magnetic field $\{B_n(p^i)\}$ need to be offset by $\{B_{block}^i\}$.

(3) scanning the permanent magnet blocks one by one according to the order, and for each permanent magnet block, analyzing whether the absolute value of the normal magnetic field $B_n$ at the locations where the normal magnet field generated by the scanned permanent magnet block with the corresponding magnetization directions present the maximum, $\{|B_n(p^i)|\}$, can be compensated to smaller values; and picking out the m (m≤n) magnetization directions that their corresponding $\{|B_n(p^i)|\}$ can be compensated; if the scanned permanent magnet block cannot generate the compensation effect with any of the alternative magnetization directions, m=0, the scanned permanent magnet block will be set as a vacancy;

(4) if m>0, selecting the magnetization direction N corresponding to the maximal $|B_n(p^i)|$ in $\{|B_n(p^i)|\}$ as the magnetization direction of the permanent magnet block, and then superposing the normal magnetic field distribution $B_{block}$ generated by the permanent magnet block onto $B_n$ to form a new normal magnetic field $B_n$ which needs to be compensated, wherein J=1, 2, . . . , m; the steps (3) and (4) essentially refer to that: when determining the magnetization direction of each permanent magnet block, among the magnetization directions that are capable of generating the compensation effect on the corresponding $\{|B_n(p^i)|\}$, the one corresponding to the maximal $\{|B_n(p^i)|\}$ is selected, and if all the magnetization directions do not generate the compensation effect, the permanent magnet block will be set as a vacancy;

(5) after the magnetization directions of all the permanent magnet blocks are determined according to the steps (3) and (4), calculating the surface integral of the normal magnetic field square $\chi_B^2 = \int_{BP}(B_n)^2 ds$ on the surface of the plasma and then continuing to perform the next iteration according to the steps (3) and (4) until $\lambda_B^2$ is converged to the predetermined level, which is the optimization strategy of the 'local compensation';

(6) in the above iterative process, setting the normal magnetic field threshold $B_n^{thr}$ on the surface of the plasma for the 'local compensation' is required; when the absolute value $|B_n(p^i)|$ of the normal magnetic field which needs to be compensated on the surface of the plasma is smaller than the given threshold $B_n^{thr}$, abandoning the magnetization direction $N^i$ of the scanned permanent magnet block for the current iteration, which is the optimization strategy of 'threshold truncation'; it requires to adjust the threshold value to find the optimal result;

(7) when the above steps are completed, analyzing the permanent magnet blocks one by one according to the order sorted by the distance to the surface of the plasma with a new optimization criterion; for each permanent magnet block, calculating the surface integral of the normal magnetic field square on the surface of the plasma $\{(\chi_B^2)_2\}$ (k=1, 2, . . . , n, n+1) after the corresponding compensation of $B_n$ using each magnetization direction, where k indicates the magnetization direction and the $(n+1)^{th}$ magnetization direction represents the permanent magnet block is a vacancy; and selecting the magnetization direction corresponding to the minimal $\chi_B^2$ as the magnetization direction of the permanent magnet block, and meanwhile update $B_n$ and $\chi_B^2$ that need to be compensated for the following work; finally replacing the steps (3) to (6) with the step (7) and continuing to perform the iteration until $\chi_B^2$ is converged to the predetermined level, which is the optimization strategy of the 'global fine-tuning.'

When the optimization strategy of 'global fine tuning' is adopted, iterative optimization is performed on all the magnet blocks, or iterative optimization is performed on a part of permanent magnet blocks selected as required. The constraint of position for magnet spaces and the selection for the magnetization directions can be adjusted more meticulously according to actual engineering requirements.

According to one embodiment of the present disclosure, an application embodiment that a magnet of a stellarator ESTELL re-designed with the magnet described in the present disclosure is provided.

Figure 8:
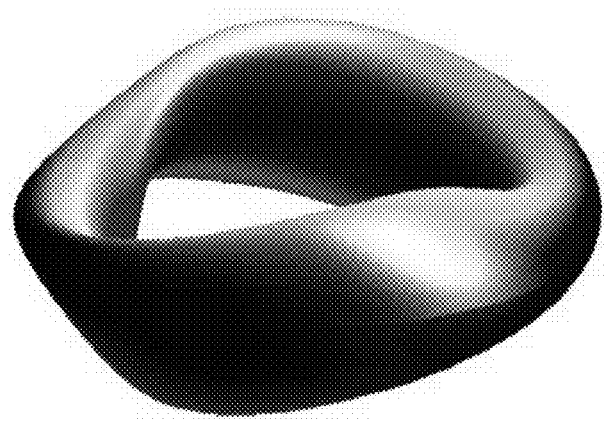
FIG. 8 is a diagram of a three-dimensional view of a boundary shape of plasma of a stellarator ESTELL.
Figure 9:
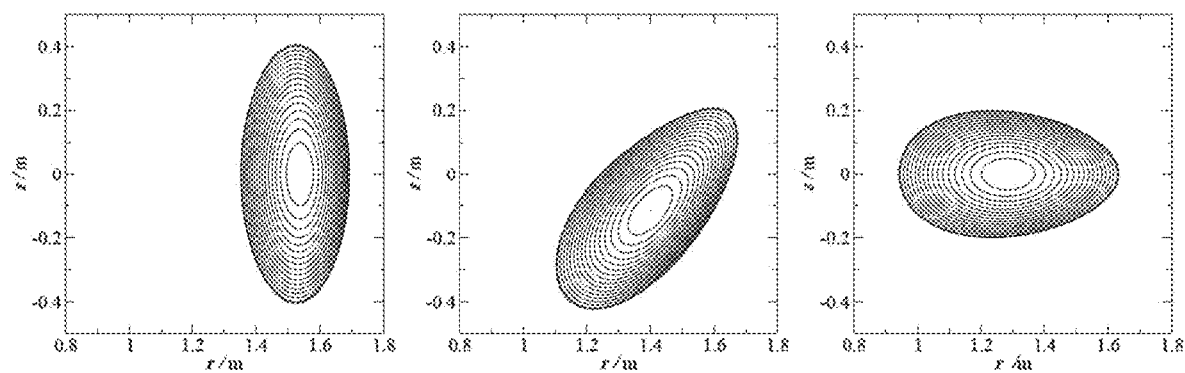
FIG. 9 is a diagram of vertical cross-sections of a boundary of the plasma of the stellarator ESTELL in different toroidal angles.
Figure 10:
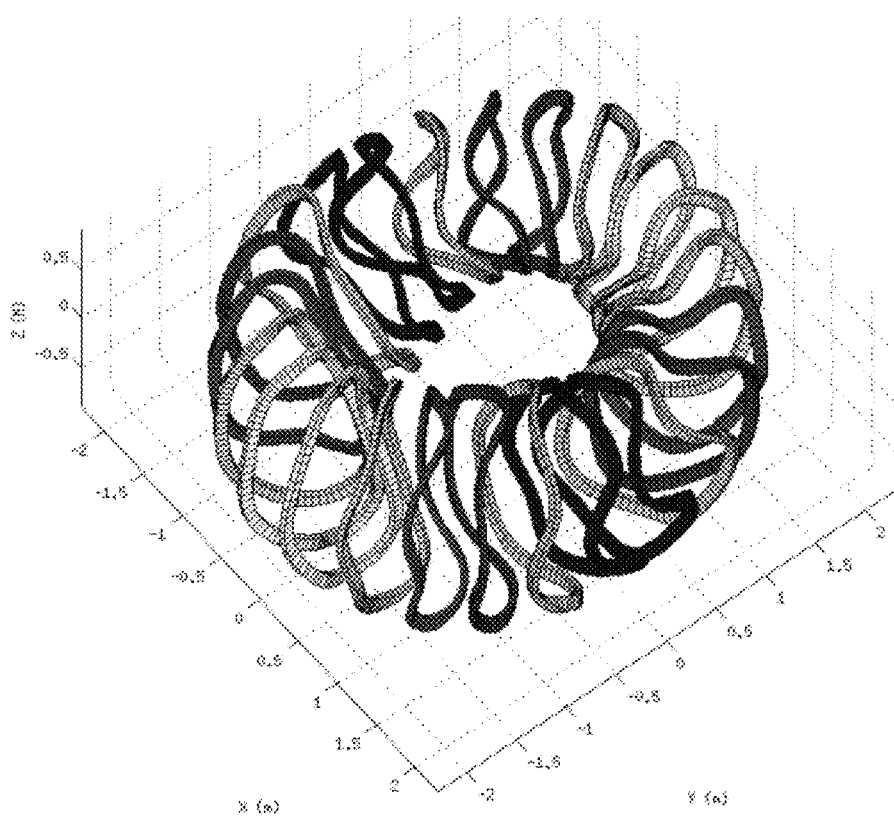
FIG. 10 is a diagram of a three-dimensional view of a coil structure of the stellarator ESTELL.

ESTELL is a quasi-axisymmetric stellarator to be built by University of Lorraine of France (the reference: M. Drevlak, et. al. ESTELL: A Quasi-Toroidally Symmetric Stellarator Contrib. Plasma Phys. 2013. 53 459), which is used for studying the planse confinement and turbulence of the quasi-axisymmetric stellarator. The main parameters of ESTELL are: the major radius R=1.4 m, the aspect ratio A=5, the average magnetic field intensity Bt=0.5 T, the toroidal periods N=2 and the rotation transform of the magnetic axis: t=0.21. The surface of the plasma and the cross-section of the equilibrium configuration are shown in FIGS. 8 and 9. ESTELL adopts a modular coil design, and a coil needs to provide a toroidal magnetic field and a poloidal magnetic field at the same time, therefore, the coils are three-dimensional according to the requirement of the stellarator, which is shown in FIG. 10.

Figure 11:
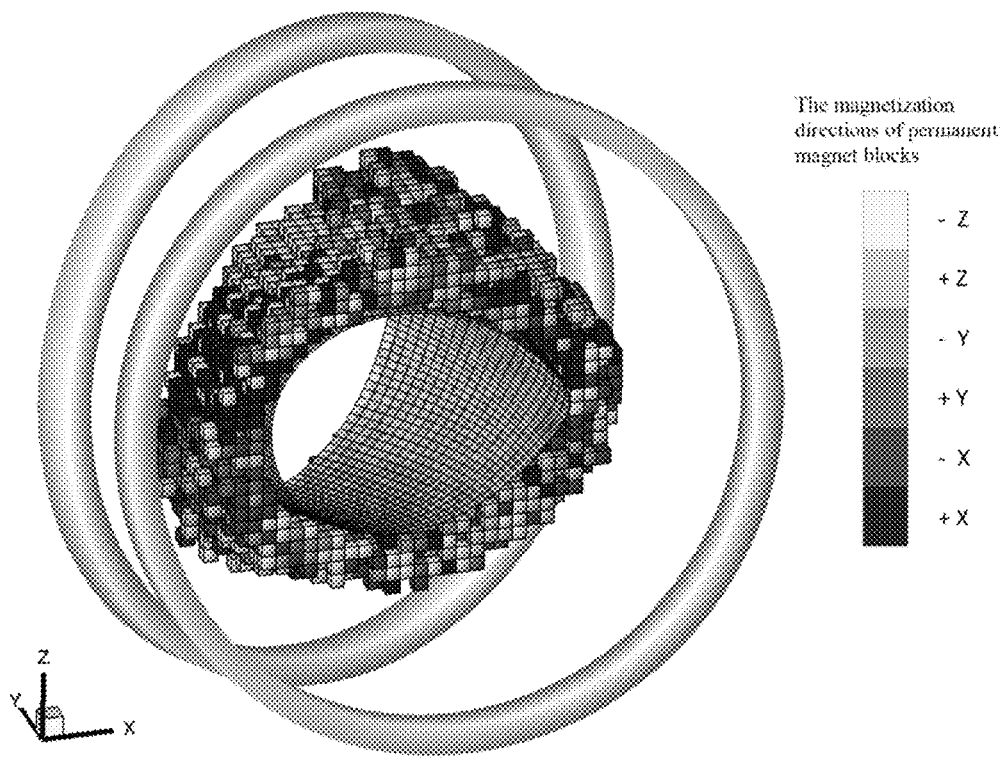
FIG. 11 is a diagram of a magnet of the stellarator ESTELL, which is redesigned by adopting a manner of combining planar coils and the cubic permanent magnet blocks (only the toroidal 1/12 circle is shown)
Figure 12:
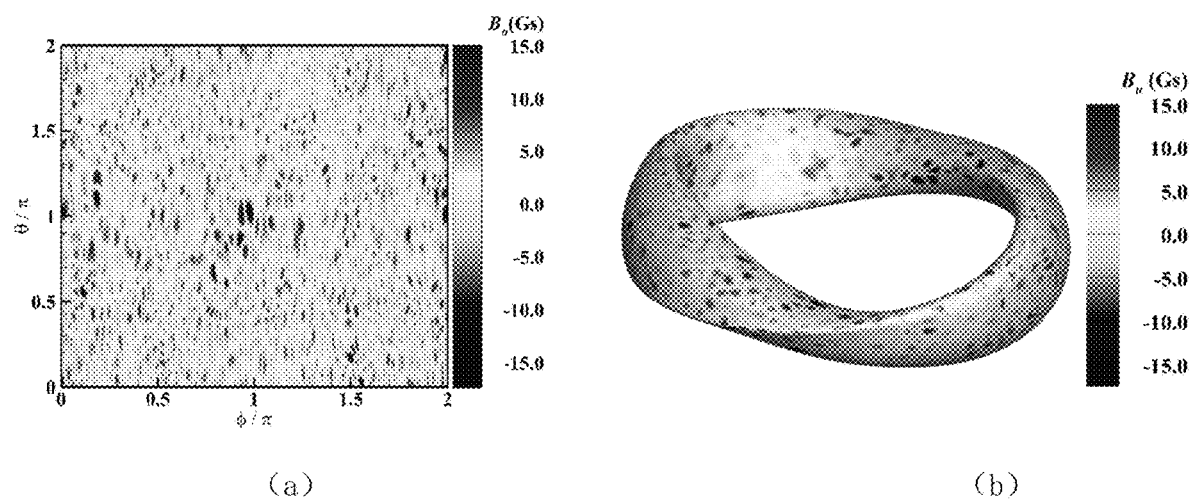
FIG. 12 is a diagram of the size and distribution of normal magnetic fields on the surface of the plasma in the stellarator ESTELL after the above permanent magnet arrangement solution is adopted: (a) is a two-dimensional view of the normal magnetic fields distribution on the surface of the plasma; and (b) is a three-dimensional view of the normal magnetic fields are distribution on the surface of the plasma.

The magnet of the ESTELL is redesigned with combining planar coils and cubic permanent magnets by utilizing the present disclosure, wherein twelve groups of planar coils with current of 595.6 kA in each coils are used to produce toroidal magnetic field of 1.0 T on the magnetic axis. Cubic permanent magnet blocks with uniform magnetization, the residual magnetism Br of 1.4 T and the edge length of 4 cm are closely arranged outside a vacuum vessel. The magnetization directions of each permanent magnet block are fixed in six alternative directions (parallel to X, Y, Z coordinate axis in a Cartesian coordinate system, and the six alternative directions are shown in FIG. 2 (*a*)). Through adoption of the optimization method of 'local compensation' originally created in the present disclosure, 40,221 permanent magnet blocks are required and the determination of magnetization direction of each permanent magnet block is obtained through calculation. FIG. 11 shows the arrangement case and the magnetization directions of a permanent magnet in the local toroidal ½12 period, wherein permanent magnet blocks in the same magnetization direction are shown in the same color and the same gray scale, and the directions +X, −X, +Y, −Y, +Z and −Z refer to the graphical Cartesian coordinate system in the figure. FIGS. 12 (*a*) and (*b*) show the size and distribution of normal magnetic fields on the surface of plasma after the above permanent magnet arrangement solution is adopted, wherein the maximal normal magnetic field $B_n$ is reduced to 15 Gs, <|B·n|/|B|> is reduced to $2.47 \times 10^{-4}$, which satisfy the design requirements (less than 0.002) of a stellarator.

The part of the present disclosure, which is not described in details, belongs to the publicly known technology in the art.

Although the specific illustrative implementation manners of the present disclosure are described above, so as to be convenient for those skilled in the art to understand the present disclosure, it should be clear that the present disclosure is not limited to the scope of the specific implementation manners; for those ordinary skilled in the art, as long as various changes are within the spirit and scope of the present disclosure, which are limited and determined by the attached claims, and these changes are obvious, all disclosures and innovations utilizing the concept of the present disclosure belong to the protection scope of the present disclosure.

The invention claimed is:

1. A stellarator magnet based on cubic permanent magnet blocks, comprising a permanent magnet (1), permanent magnet support structure (2), coil systems (3), and a vacuum vessel (4), wherein, the permanent magnet (1) comprises a large number of cubic permanent magnet blocks with same size;

all the cubic permanent magnet block in the permanent magnet (1) are uniformly magnetized and have same magnetization;

the magnetization directions of each cubic permanent magnet block in the permanent magnet (1) are defined in a limited number of fixed alternative directions; and the alternative magnetization directions comprise: perpendicular to a surface of the cubic permanent magnet block, or from one edge of the cube perpendicular to another parallel edge, or from one vertex of the cube points to another vertex;

the permanent magnet (1) is arranged outside the vacuum vessel (4) and in a space surrounded by the coil systems (3); and the permanent magnet (1) is fixed by the support structure (2) and the cubic permanent magnet blocks are embedded into compartments formed by the permanent magnet support structure (2).

2. The size of each permanent magnet block is less than that of each cubic cell, and the gap between every two adjacent permanent magnet blocks is a space occupied by the permanent magnet support structure (2).

3. The stellarator magnet based on cubic permanent magnet blocks according to claim 1, wherein part of the compartments formed by the support structure used for fixing the permanent magnet blocks could be empty, or could be filled by non-magnetic material blocks.

4. The stellarator magnet based on cubic permanent magnet blocks according to claim 2, wherein the small cubic cells used for determining the size and the positions of the cubic permanent magnet blocks are formed by dividing the space with a grid into array-arranged cubic cells with same size along an x-direction, a y-direction and a z-direction in a Cartesian coordinate system, and the adjacent three edges of each cubic cell are respectively parallel to the x-axis, y-axis and z-axis.

5. The stellarator magnet based on cubic permanent magnet blocks according to claim 2, wherein the small cubic cells used for determining the size and the positions of the cubic permanent magnet blocks are formed alternatively by dividing a right prism space, which is coaxial with the toroidal vacuum vessel (4), into a plurality of triangular prisms by the cutting planes connected with the center axis and side edges of the right prism, each triangular prism is divided into array-arranged small cubic cells with same size, and the two adjacent surfaces of each cubic cell are parallel to the side surfaces and the bottom surface of the triangular prism.

6. The stellarator magnet based on cubic permanent magnet blocks according to claim 5, wherein some small non-cubic cell are formed simultaneously due to intersection of the cutting planes and the grid when dividing each triangular prisms into small cubic cells, these non-cubic small cell could be empty or installed by shape-matching permanent magnetic blocks, the magnetization directions of the non-cubic permanent magnet blocks are still defined in a limited number of fixed alternative directions; and the alternative directions comprise: perpendicular to one surface or one edge of the non-cubic permanent magnet block.

7. The stellarator magnet based on cubic permanent magnet blocks according to claim 1, wherein the shape of the permanent magnet blocks can be replaced by other regular shapes which comprise inequilateral cuboid, parallelogram prism, triangular prism, trapezoid prism and the like.

8. The stellarator magnet based on cubic permanent magnet blocks according to claim 7, wherein when permanent magnet blocks in other certain regular shapes are adopted, the permanent magnet is still formed by the permanent magnet blocks with same shape, same size, uniform magnetization and same magnetization, and the magnetization directions are defined in a limited number of alternative directions; the size and position of permanent magnet blocks are also determined by dividing the space occupied by permanent magnet into array-arranged small cells with one adopted shape; and the small cell with shape different from the adopted shape, which simultaneously formed, could be filled by shape-matching permanent magnet blocks or be empty.

* * * * *